Jan. 26, 1965   E. G. DAVIS ETAL   3,167,156
DISC BRAKE
Filed Dec. 26, 1963   5 Sheets-Sheet 3
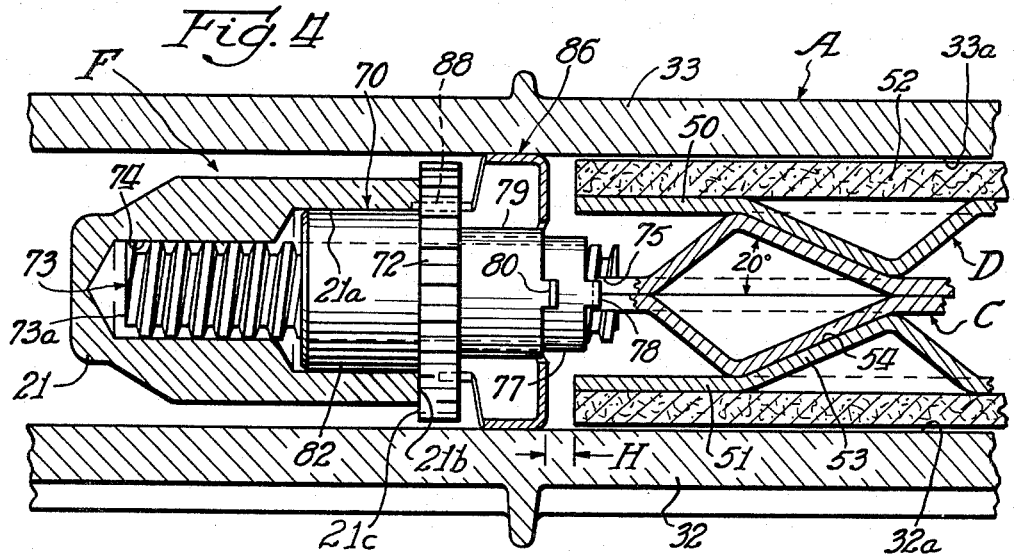
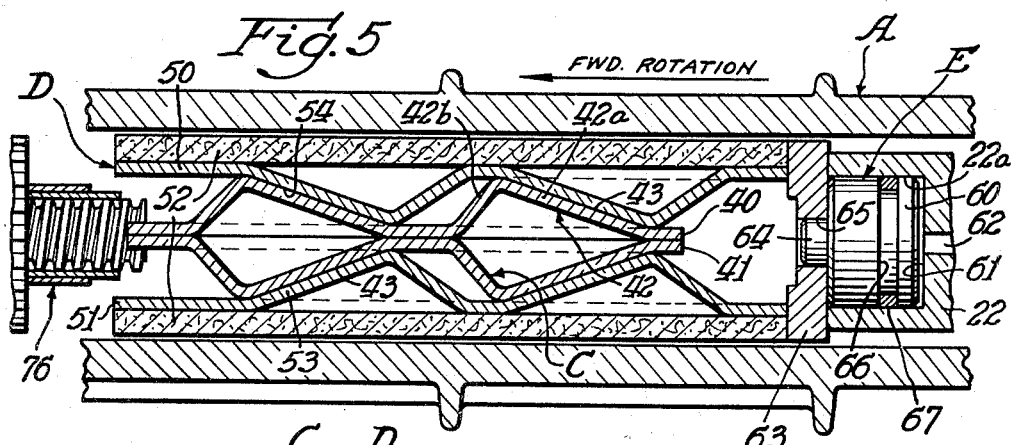
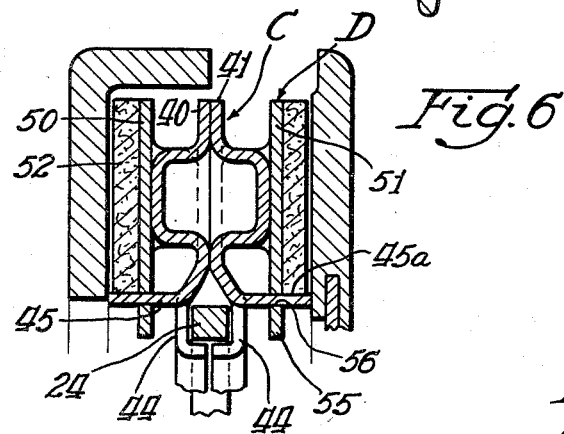
Inventors:
Ernest G. Davis and
Elbert E. Wiseman
By: Joseph W. Malleck Atty Inventors:
Ernest G. Davis and
Elbert E. Wiseman
By: Joseph W. Malleck Atty

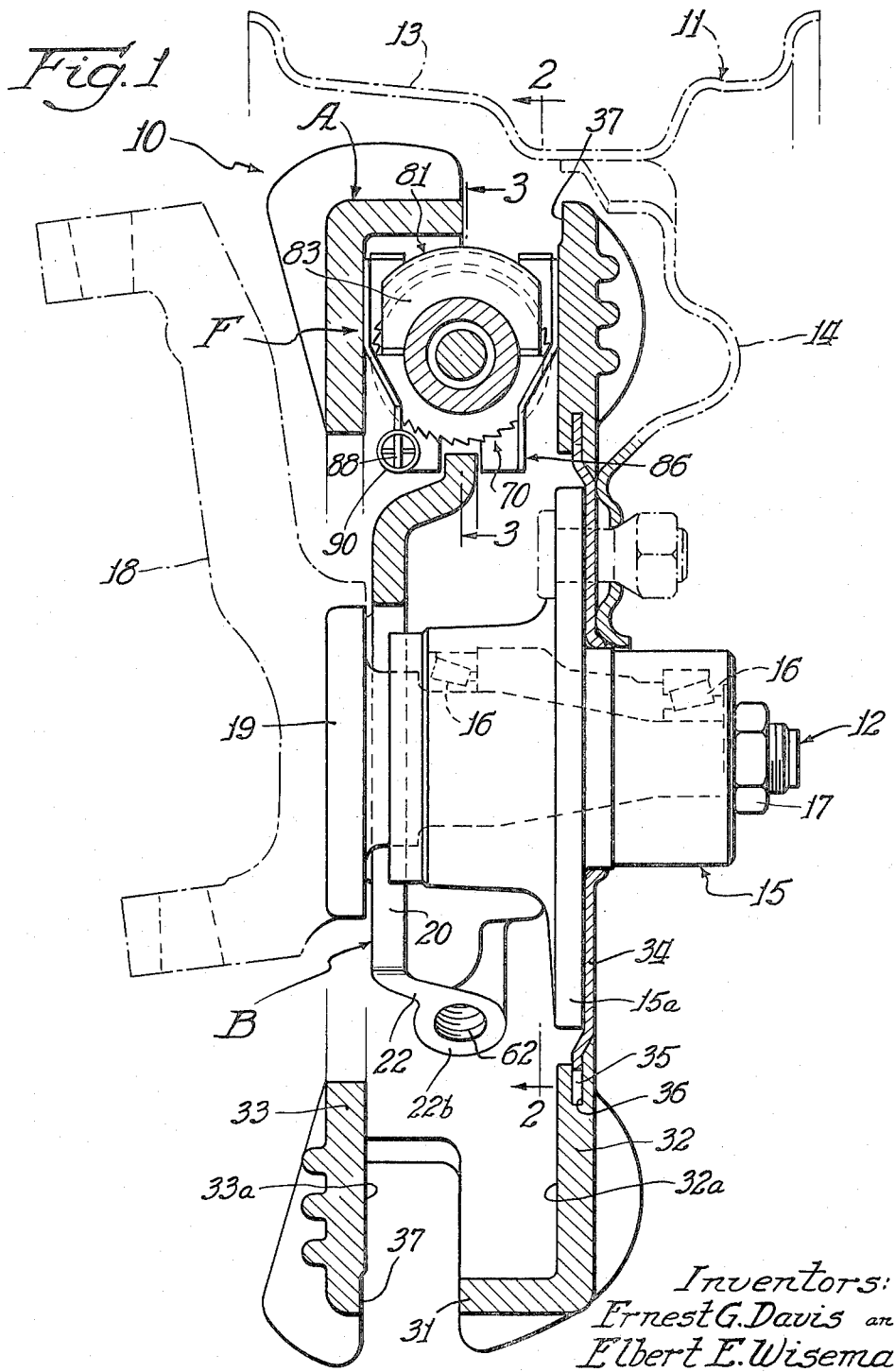

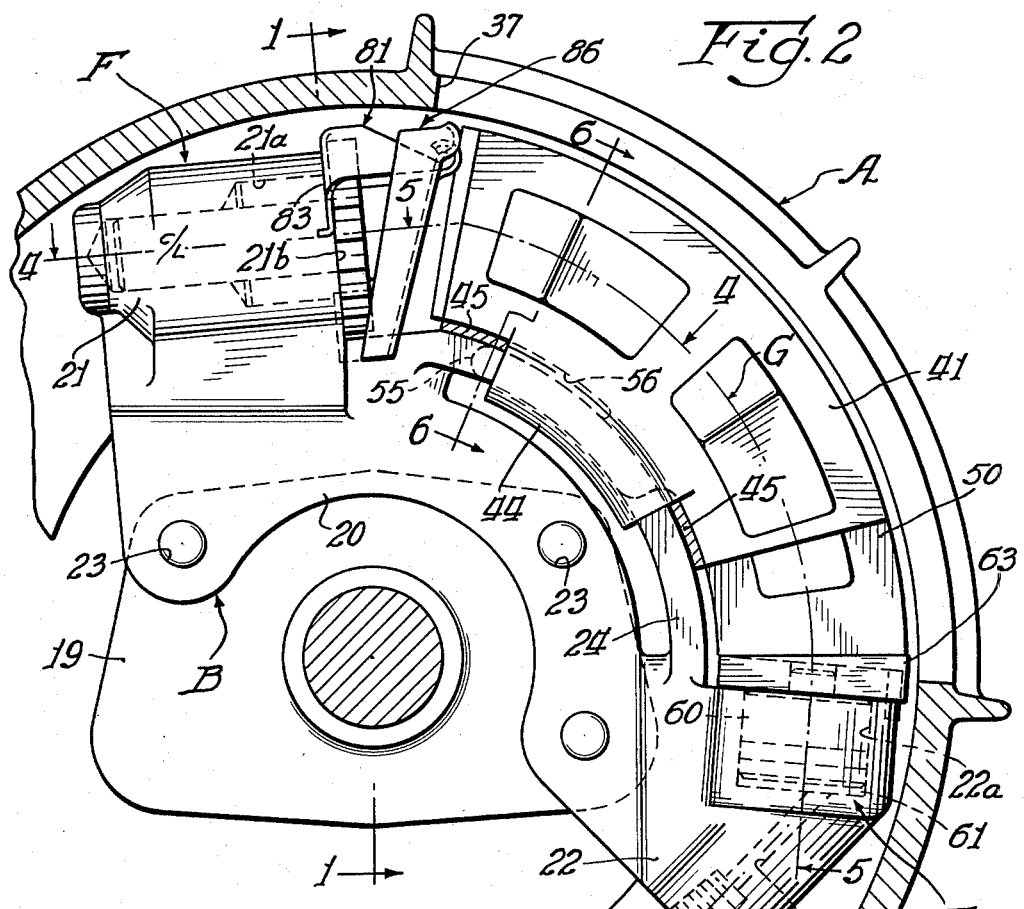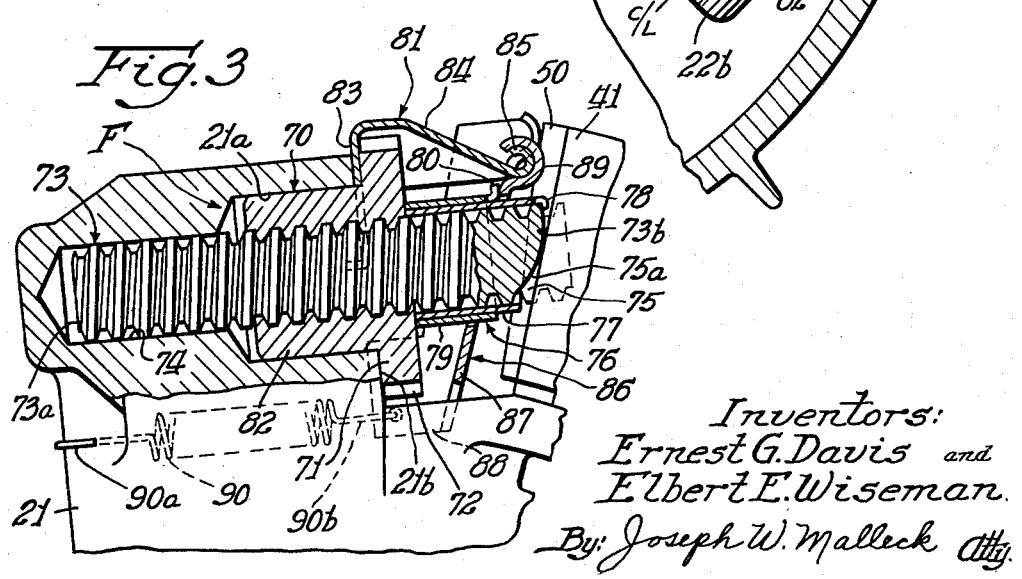

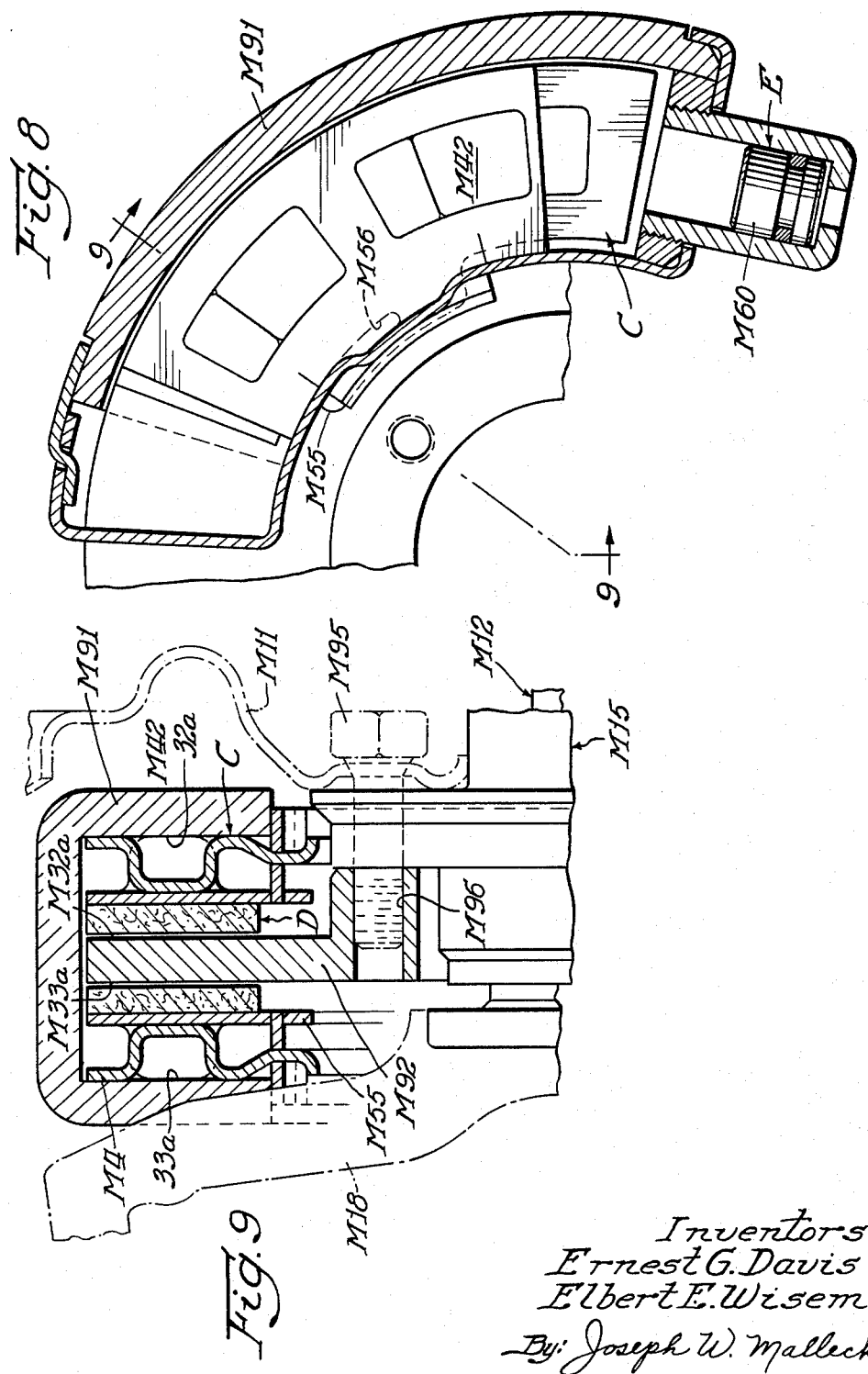

United States Patent Office 3,167,156
Patented Jan. 26, 1965

3,167,156
DISC BRAKE
Ernest G. Davis and Elbert E. Wiseman, Chicago, Ill., assignors to Borg-Warner Corporation, a corporation of Illinois
Filed Dec. 26, 1963, Ser. No. 333,606
16 Claims. (Cl. 188—72)

This invention relates to brake devices and more particularly to disc brakes of a type generally referred to as non-boosted (self energized).

Non-boosted disc brakes are known wherein annular friction elements are urged axially against annular friction surfaces (either internal or external) by camming means actuated by relative pivotal movement between a reaction member and means supporting said friction elements. Such types include rotary members to be braked which may have a configuration where the friction surfaces are internal within an enveloping housing serving as the rotary member, or the types which are more commercially known where the rotary member to be braked is a simple disc straddling the interior of a fixed caliper housing serving as the reaction member. However, in all of the cases the friction pads which are urged into engagement with the rotary member for braking are not pivoted but are provided with limited axial movement.

The invention herein is directed to two basic objects, the first of which is to provide a disc brake of the above type, which possesses self-energizing characteristics but is freed of the insecurity and risk experienced by prior art devices wherein the self-energization is not fully and reliably released upon relief of the actuating member. A particular structural feature pursuant to this is the provision of hydraulic actuating means which directly imparts a thrust to the friction pad elements, whereby they become the pivotal mover in a camming relationship between the pads and the reaction means (the rotary member to be braked and the reaction means are fixed in their spaced relation). This has the benefit wherein, upon relief of actuating force, all *lateral* camming forces are completely relieved, thus destroying the possibility of frictional lock.

Another basic object of this invention is to provide a disc brake of the above type which is of unique compactness and enconomy, permitting such brakes to be used successfully for passenger vehicle use competitive with drum brakes currently used. A structural feature pursuant to this is the provision of detachable sheet metal structural elements for substantially all of the operational parts of the brake, while designed to accommodate the large stresses experienced during operation.

Another feature is the provision of arcuate segmental reaction members and arcuate segmental friction pads, each having at least one and preferably a plurality of inclined ramps providing a camming effect for engaging the disc brake.

Another feature is the provision of unique detachable support plates for the friction pads and reaction members, thereby permitting easier repair of the brake.

Other features include the provision of hydraulic actuation means substantially enclosed in the brake housing and adapted to impart a thrust in a direction substantially along a chord of a circle inscribing the brake (rather than laterally as currently used in the art); another feature is the provision of an extremely economical wear adjuster cooperating with the compact brake arrangement to facilitate simplicity of structure.

Other objects and features of the invention will be readily apparent to those skilled in the art from the specification and appended drawings, illustrating a certain preferred embodiment and alternative arrangement, in which:

FIG. 1 is a central sectional elevational view of a disc brake, taken along line 1—1 of FIG. 2, embodying the principles herein and illustrating certain parts in broken outline;

FIG. 2 is a fragmentary sectional view taken substantially along line 2—2 of FIG. 1;

FIG. 3 is an enlarged fragmentary central sectional view taken substantially along line 3—3 of FIG. 1;

FIG. 4 is an enlarged sectional view taken substantially along line 4—4 of FIG. 2;

FIG. 5 is a sectional view taken substantially along line 5—5 of FIG. 2;

FIG. 6 is a sectional view taken substantially along line 6—6 of FIG. 2;

FIG. 8 is a central elevational view of an alternative embodiment; and

FIG. 9 is a sectional view taken substantially along line 9—9 of FIG. 8.

Figure 6A:
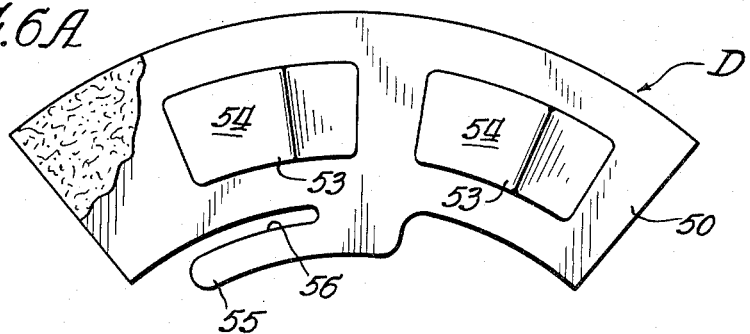
FIG. 6A is a view of pad element.
Figure 7:
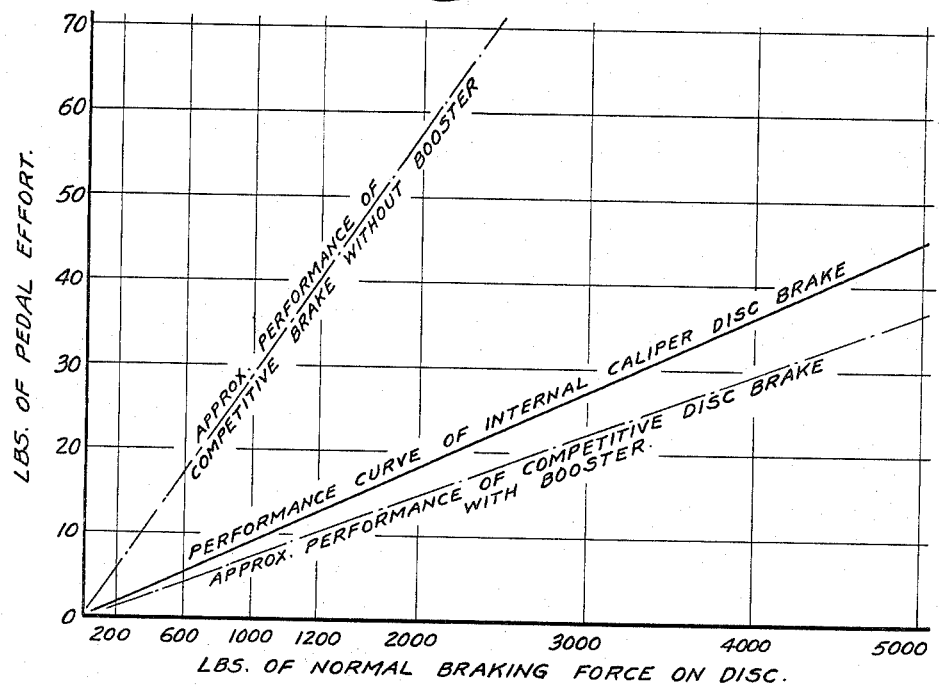
FIG. 7 is a chart illustrating operating characteristics of the devices herein disclosed.

Turning now to the drawings, and more particularly to FIGS. 1–6, wherein is illustrated the preferred embodiment of this invention. The disc brake herein disclosed is of the "external" pad type wherein the friction pads are urged laterally outwardly against the interior of a rotary member adapted to be braked. The disc brake, generally identified as 10, broadly comprises a rotary housing A mounted at one side thereof to a wheel frame 11 rotatably mounted upon a non-rotatable spindle 12; the wheel and spindle configuration is that typically used for a front wheel of a a passenger vehicle. Carrier means B is secured to the spindle and reaction means C is detachably secured to the outer periphery of the carrier means and is disposed intermediate within the enclosed space of said housing. Friction elements D (comprising friction pads) are detachably mounted upon the reaction means and disposed between the reaction means and the internal surfaces of the housing A. Actuator means E are mounted upon one end of the carrier means effective to impart a direct thrust upon the friction elements in a direction substantially along a chord of a circle inscribing the housing A. At the opposite ends of the friction elements and carried by the carrier means is a wear adjuster F, effective to adjust the pivotal movement of the pads so as to accommodate wear thereof.

Turning now more specifically to the major elements of said disc brake, the wheel frame 11 comprises an outer portion 13 of a generally semi-doughnut shape effective to support a pneumatic tire as currently known in the art, and a wheel web 14 generally dish-shaped in the sense that the outer periphery is secured (as by welding) to a central portion of the outer portion 13 with the intermediate portion of the web offset to define with the outer portion a toroidal space for accommodating the disc brake elements herein. The wheel web 14 is secured to a hub 15 rotatably mounted as by bearings 16 upon the spindle 12. The hub is secured on the spindle by threaded fastener 17 and the inner portion of the spindle has a forked portion 18 adapted for mounting facility. Integral to the spindle and forming part of the forked portion is a machined boss 19.

The housing A (or disc as known in the art) comprises a generally continuous annular body constituting the rotary member to be braked and has a radial cross-section which is substantially U-shaped. The U configuration is defined by an annular ring 31 provided with integral radially inwardly extending annular flanges 32 and 33. The width of said ring and radial extent of each flange is substantially the same. The internal annular sides of the flanges provide axially aligned frictional surfaces 32a and 33a against which the braking elements may act. On side 32 of the housing is mounted upon a drive plate 34, which is sandwiched between the web 14 of the wheel and the flanged extension 15a of the hub 15. The plate is provided with a plurality of keys 35 on the outer periphery thereof, which are adapted to fit within suitably mated cast openings 36 in the internal periphery of flange 32. Peripheral openings 37 are provided in the annular ring 31 to accommodate and provide for access to the internal detachable elements of the brake device. The openings, as preferably shown, each have a width equal to or less than one half the width of the outer ring and positioned to one side thereof; the other opening is alternated to the opposite side of the housing and generally diametrically in an opposite location. Thus, each side of the internal braking elements may be approached with ease.

The carrier means B comprises a cast body or yoke of metal including an arcuate web 20 with end portions 21 and 22 on opposite ends thereof; the end portions are offset in a plane laterally spaced from that of the generally flat arcuate web (see FIG. 1); each end portion defines a cylindrical chamber 21a and 22a respectively having one terminal end 21b and 22b which is open. The centerline C/L of each cylindrical bore is disposed to lie intermediate the flanges 32 and 33 of the housing and is directed tangent to an arcuate plane G which is intermediate the radial extent of the housing flanges. The web 20 is positioned to abut the boss 19 of the spindle (see FIG. 1) and has three openings 23 through which extend fasteners for attaching the carrier means B to the boss 19. The most widely spaced of the openings 23 are here shown at generally 180° apart. The space defined or included between the terminal ends 21b and 22b is here shown to be approximately 90° or a one-fourth sector of the entire angular brake. The carrier means also includes an arcuate bar 24 extending in a plane generally bisecting the housing and serves as a retention means to which other elements of the brake are attached.

The reaction means C comprises a back-to-back arrangement of specially formed sheet metal plates 40 and 41. Each reaction plate comprises a body of sheet metal of generally arcuate segmental shape, here preferably a 63° sector, and has a height generally commensurate with the interior height of the housing flanges. Each plate has ramp means 42, also of arcuate segmental shape deformed from the plane of the plate, here preferably two circumferentially spaced. Each ramp means defines a ramp surface 43 which is inclined in a direction outwardly toward the housing and in the same direction as that of the forward rotation of the wheel; each ramp surface defines a ramp angle of generally 20° with respect to the plane of rotation of the brake device. The outward bend 42a and return 42b of each ramp occupies approximately a 24° sector of the device. The outer and intermediate portions of the reaction plates are in back-to-back abutment (see FIG. 6). At the radially inner portion of each plate, central fingers 44 are formed to hook about the bar 24 of the carrier means providing a mounting which serves to retain the reaction means C against reaction forces. The reaction plates are generally cradled against pivotal and lateral movement by virtue of forces acting upon them; such forces are imparted by a fixed stop at one end of the plates and the reaction forces of the friction elements D.

Spaced circumferentially on each side of fingers 44 are flanges 45; the flanges are deformed to provide an arcuate surface 45a generally aligned with the bottom edge of the housing flanges; the ends of the flanges are disposed closely contiguous the housing friction surfaces 32a and 33a to cooperate in defining arcuate segmental spaces within which the friction elements may be positioned to operate.

The friction elements or pad means D comprise a pair of braking sectors 50 and 51 formed from sheet metal plates detachably mounted upon the reaction means C; each sector has suitable friction material or pads 52 bonded to the side thereof. Each plate is of an arcuate segmental configuration, approximately 80°; each plate has ramp means 53 formed outwardly from the plane of the plate similar to the manner in which the ramp means 42 are formed on the reaction plates. The ramp means 53 have surfaces 54 inclined in a direction to mate with the inclined surfaces 43 of the reaction ramps. The plates ride on the flanges 45 and each have an arcuate tab 55 formed at the bottom periphery of each of the backing plates and adapted to hook about one of the flanges 45 of the reaction plates. The slot 56 formed between the bottom periphery of the backing plate and the tab is of sufficient arcuate extent to permit relative pivotal movement between the sectors 50 and 51 and the reaction means 42, effective to promote full brake engagement.

The actuator means E comprises a piston 60 slidably mounted within the cylinder 22a of the end portion 22 of the carrier means and cooperates in defining a trapped fluid cavity 61 which is communicated by a fluid intake means 62. One side of the piston is journalled in a pressure element 63 by an integral cylindrical nose 64 fitting within an opening 65 of the element 63. The pressure element 63 is adapted to span across the ends of the friction elements D to impart pivotal thrust thereto. The other side of the piston is provided with an annular groove 66 at the edge thereof within which is received a conventional O-ring 67. Hydraulic connections can be suitably made and disposed radially inwardly of the brake housing A so as not to interfere with the operation of the brake.

Wear adjuster means F, as shown more particularly in FIGS. 3, 4 and 5, comprises a ratchet wheel 70 journalled within the cylindrical opening 21a provided in the end portion 21 of the carrier means and has an enlarged flange 71 extending radially outwardly about the terminal end 21b and carries a series of ratchet teeth 72 on the outer periphery thereof. One side 21c of the ratchet flange is in abutment with the terminal end portion 21b of the cylinder. Threadably received within the ratchet wheel is a screw extension bar 73 having one end 73a extending into a reduced stepped bore 74 of the cylindrical opening, and an opposite end 73b extending toward and in abutting engagement with the end of the reaction plates. The abutting end 73b is provided with a slot 75 to receive the double ply of reaction plates (see FIG. 5), the bottom of the slot having an arcuate surface 75a (see FIG. 3) to accommodate rocking movement between the screw and the end of the reaction plates and to keep the point of contact of the reaction plates C as close to the center line C/L of screw 73 as possible to provide an equal load throughout the adjustment stroke. A telescoping cylindrical shield 76 is employed about the screw having a first sleeve 77 with a radially inwardly turned tab 78 adapted to fit about the end of the outer surface of the screw, and an outer sleeve 79 having a radially outwardly turned tab 80 at one end, and an opposite end which is adapted to be maintained in engagement with the ratchet wheel, the two sleeves telescoping upon extension of the screw as will be hereinafter described. A pivot support 81 is mounted upon the reduced neck portion 82 of the ratchet wheel and has an arcuate flange 83 fitting between the ratchet wheel 71 and the terminal end portion 21b. The pivot support 81 has an extending flange 84 terminating in a return bent pivot 85 extending laterally of the interior of the housing. A pivot bracket 86 is mounted upon pivot 85 and comprises a body of sheet metal having two depending arms 87 disposed on opposite sides of the screw, one arm having a foot portion 88 adapted to lock into one of the ratchet teeth 72 of the wheel. The arms depend from a cross member 89 which has a return bent configuration adapted to pivotally nest about the pivot 85. A coil tension spring 90 has one end 90a mounted to the carrier B and opposite end 90b hooked into the foot portion of the pivot bracket 86, normally urging such foot portion into a locked position in one of the ratchet wheel teeth. Spring 90 is disposed on a bias with respect to a centerline of the cylinder 21 so that it tends to draw the foot portion in a slight lateral direction as well as toward the ratchet wheel.

Operation of the wear adjuster F comprises first the necessary slack take-up of the normal gap H (see FIG. 4) between the end of the pads and the upper portion of the pivot bracket 86. Such slack take-up will occur when the friction pads have worn to a sufficient extent that they ride up higher on the ramps of the reaction means. At such point, the pivot arms will be moved to withdraw the locking foot 88 from the ratchet wheel, freeing the ratchet wheel for rotation. Normal gap H between the friction pads and the caliper braking surfaces is taken up by movement of the piston 60. The pads and the pivot bracket 86 are always in contact, held there by spring 90. As wear of the pads occurs, the pads will ride higher on the reaction ramps. With sufficient movement of the pads, the pivot bracket 86 moves until foot 88 is withdrawn from the ratchet wheel. The reaction ramp force being applied through the screw to the ratchet wheel to the cylinder bore creates a friction force between these surfaces and will not allow relative motion. When the foot 88 is free of the ratchet wheel, spring 90 will pull the foot toward the wheel, thus moving the foot into a position to engage a new tooth when allowed to reenter the ratchet wheel. It is important to note that adjustment will take place only when the pivotal movement of the pads is sufficient to not only take up the gap H but also pivot the arms so that the foot sufficiently clears the ratchet teeth.

The ratchet wheel 71 is rotated upon the return movement of the friction elements by release of the brake. Relief of the friction elements abutting the pivot arms 87 permits the spring 90 to return the arms 87 to their original position. When braking force is released, spring 90 also insures the return of the frictional elements and piston to their original position. However, since the spring 90 is slightly biased relative to the plane of rotation of the brake, it will tend to draw the arms 87 over a slight lateral extent sufficient to jump into the next adjacent tooth of the wheel and thereby impart a small rotative step to the ratchet wheel. Rotation of the ratchet wheel in the direction illustrated will cause the bar 73 to extend outwardly, thereby adjusting the position of the reaction plates upon the carrier means, as well as adjusting the shield 76 by telescoping movement.

FIGS. 8 and 9 illustrate another alternative embodiment in which the friction pads are adapted to be urged laterally and moved toward each other to engage a rotating single ply disc M92 centered within a caliper fixture M91. This embodiment illustrates further the scope of this invention wherein the friction surfaces and direction of urging of the pads may be reversed, while still retaining the improved self-energizing combination. In this embodiment similar parts to that of the preferred embodiment have similar reference numerals, prefixed by M. Here, there is no wear adjuster illustrated; the reaction plates M42 are secured to the caliper fixture M91, which in turn is secured by cap screws M95 (threadably received in openings M96 in the disc) to the wheel frame M11.

In both devices operation for brake engagement is achieved by providing a pressure signal to actuate the piston M60, which in turn urges the friction elements D through a limited pivotal movement, thereby camming laterally inward on the ramps M42 of the reaction plates. The internal surfaces 32a and 33a of the brake housing (FIG. 1) or the external surfaces M32a and M33a of the disc (FIG. 9) will be braked and the forward rotation of the rotary element will assist in urging the friction pads further along the ramps to provide an assist or self-energization of the lateral force. However, upon release of hydraulic actuation there will be no further lateral force or effect.

In prior art devices the members actuated for providing camming have usually been the reaction members; hydraulic force has never been applied directly to friction pads while permitting them to pivot slightly for camming. Thus, any lateral space that was provided between the rotary member and the reaction member was consumed as brake engagement was promoted. In order to disengage the brake, the reaction member had to be backed off in some fashion to regain the gap that previously existed between the rotary member and the reaction member.

In the instant invention, the reaction member and rotary member have a predetermined lateral spacing; this spacing is retained throughout the engaged, as well as disengaged condition of the brake. It is only the friction pads which pivot and thereby ride upon the ramps to achieve braking. However, upon release of the hydraulic force the geometry of the structure hereby relieves all lateral urging of the pads toward the housing and permits them to adjust within the fixed gap between the reaction member of the housing to avoid any possibility of locking on the ramps.

While we have described our invention in connection with certain specific embodiments thereof, it is to be understood that this is by way of illustration and not by way of limitation, and the scope of our invention is defined solely by the appended claims, which should be construed as broadly as the prior art will permit.

We claim:

1. A brake of the disc type, comprising: a rotary member rotatable in at least one direction, and having at least one pair of annular friction surfaces generally aligned about the axis of said rotary member; reaction means fixed against rotary movement having segmental arcuate ramps provided with surfaces inclined toward said friction surfaces in said one direction of rotation of the rotary member; segmental friction elements disposed between each of said friction surfaces and adjacent ramp surface, each having a ramp follower surface adapted to be cammed toward said friction surfaces upon limited pivotal movement of said friction elements; and actuator means effective to impart a thrust directly upon said friction elements for promoting limited pivotal movement thereof, said thrust being directed along a chord of a circle inscribing said brake.

2. A brake device as in claim 1, in which each said follower surface has a configuration substantially the same, but adapted to mate with the respective ramp surface, and both said arcuate segmental ramp means and segmental friction elements being comprised of single ply sheet metal with deformations therein defining said ramp or follower surfaces.

3. A brake device as in claim 1, in which said actuator means comprises a hydraulic servo mechanism provided with at least one piston means effective to impart limited pivotal movement to said friction elements.

4. A brake device as in claim 1, in which each of said ramp surfaces and follower surfaces are disposed at an angle generally of 20° with respect to the plane of rotation of the rotary member.

5. A brake device as in claim 1, in which said reaction means comprises a wear adjuster means and a carrier yoke provided with end portions disposed adjacent opposite ends of said segmental friction elements, one portion adapted to mount said actuator means and the other portion adapted to mount said wear adjuster means.

6. In a non-boosted disc brake, for use in connection with a vehicle having a wheel to be braked at least against forward rotation including a non-rotating axle and a brake housing provided with a pair of internal annular friction surfaces, said housing being drivingly connected to said wheel, and a brake carrier connected to said axle, the combination comprising: a reaction sector mounted on said brake carrier having oppositely facing ramps inclined outwardly in the direction of forward rotation of said wheel; a pair of braking sectors disposed on opposite sides of said reaction sector and mounted for limited movement both axially and pivotally; and actuating means effective to act directly upon said braking sector for imparting limited pivotal movement thereto, whereby said braking sectors will be urged to ride upwardly on said ramps to promote braking of said housing and effective to insure release of said braking sectors upon relief from said actuating means.

7. The combination as in claim 6, in which said reaction sector is comprised of a double ply of sheet metal, each ply being deformed to provide said ramps.

8. The combination as in claim 6, in which said ramps define an angle with respect to the plane of rotation of said housing generally of the order of 20°.

9. The combination as in claim 6, in which said reaction sector is detachably mounted upon the periphery of said brake carrier, and said braking sectors are in turn detachably mounted upon said reaction sector, said reaction sector and braking sectors together substantially occupying the internal space defined by said housing.

10. A disc brake for a vehicle having a wheel to be braked which is rotatably mounted upon a non-rotatable spindle, comprising: a unitary internal brake disc having a hollow configuration defined by an annular ring integrally provided with radially inwardly extending spaced annular flanges, each flange being provided with an internal smooth friction surface; carrier means non-rotatively supported on said spindle comprising an arcuate web with end portions defining hollow cylindrical chambers opening toward said web; a reaction sector comprising stamped sheet metal reaction plates having deformations defining ramp surfaces, said reaction plates being disposed back to back with said ramp surfaces facing outwardly, each of said reaction plates having a flanged portion effective to ride on said carrier means to permit circumferential adjustment only, said plates further being provided with laterally extending flanges defining an arcuate track in cooperation with said brake disc; friction elements having mounting plates provided with ramp surfaces adapted to mate with said ramp surfaces of said reaction sector, each of said mounting plates being disposed within one of said tracks and adapted for limited pivotal and axial movement; and hydraulic actuating means cooperating with one of said cylindrical chambers of said carrier means effective to selectively impart a limited pivotal movement directly to said friction elements whereby said friction elements will be caused to be cammed outwardly into engagement with said brake disc surfaces, said engagement being assisted by the rotation of said brake disc, said friction elements being assured of complete release from said disc surfaces upon relief of said hydraulic actuating force.

11. A disc brake as in claim 10, in which said brake disc has circumferential openings provided therein, the extent of said openings being conterminous with the arcuate configuration of said friction elements providing access thereto, each opening having a width equal to or less than one half the width of said disc, at least one opening being provided on alternate sides of said disc in order to provide access to one or the other of said friction elements.

12. A disc brake as in claim 11, in which said disc is provided with equally circumferentially spaced ribs extending laterally about the outer surface of said disc, said disc further being provided with a plurality of arcuate ribs on the outer surface of said disc flanges.

13. A disc brake as in claim 10, in which a stamped circular plate is employed for mounting said brake disc upon said wheel, said brake disc and plate having cooperating openings and mating keys for providing a detachable driving connection therebetween.

14. A disc brake as in claim 10, in which said brake disc has a radial cross-sectional configuration generally U-shaped, said U being comprised of said annular ring and said annular flanges, each of said flanges and rings having a dimensional width substantially equal.

15. A brake device for a vehicle having a rotatable wheel to be braked which is rotatably mounted upon a non-rotatable spindle, said wheel being of the type having a frame comprised of an annular semi-toroidal portion mounted upon a dish-shaped web, the outer periphery of the web being secured to an intermediate portion of said semi-toroidal part, the combination comprising: a continuous unitary brake housing having a hollow configuration providing axially spaced annular friction surfaces, said housing being disposed entirely within the toroidal interior space defined by said wheel frame and rotatively mounted upon the web of said wheel; carrier means non-rotatably supported on said spindle; stamped sheet metal reaction plates mounted upon the periphery of said carrier means and disposed within the interior of said housing, each of said reaction plates having camming ramps inclined outwardly in the direction of rotation of said wheel; friction pads mounted upon backing plates of sheet metal, said backing plates having camming ramps adapted to mate with the reaction ramps, said friction pads being disposed between said annular friction surfaces of the housing and said reaction means adapted for limited pivotal and axial movement; hydraulic actuating means disposed within said housing and adapted to impart a thrust against said friction pads in a chordal direction with respect to a circle inscribing said housing whereby said pads will be cammed outwardly towards said annular friction surfaces to brake said housing and insure complete release upon de-activation of said hydraulic means; and wear adjuster means disposed entirely within said housing for adjusting the circumferential positioning of said reaction plates to accommodate gradual wear of said friction pads.

16. A brake device as in claim 15, in which said wear adjuster means is particularly characterized by a ratchet wheel rotatively mounted upon an axis tangent to a medium line of a reaction plate; a fixture locked against an adjustment bar threadably carried within said ratchet wheel and held against rotation by said fixture; lock means for normally preventing rotation of said ratchet wheel and adapted to be tripped by excessive movement of said friction pads for releasing said ratchet wheel; and resilient means effective to return said lock means to said ratchet wheel in a rotatably advanced position whereby said threaded extension bar is moved outwardly to adjust the circumferential position of said reactor plates.

No references cited.